April 24, 1962 D. O. ELLIOTT, JR 3,030,859
METHOD OF MAKING CONTACT LENSES
Filed May 25, 1959 2 Sheets-Sheet 1
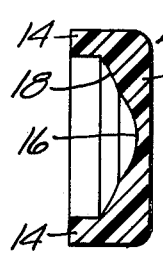
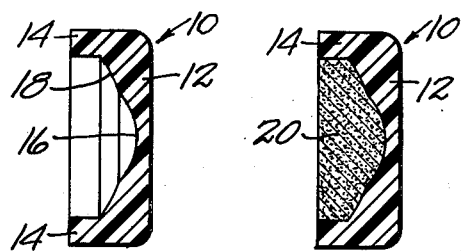
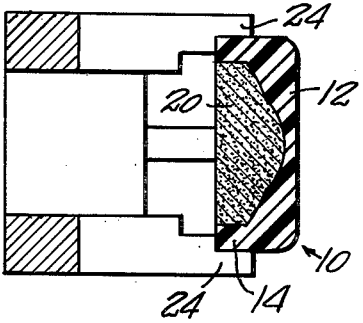
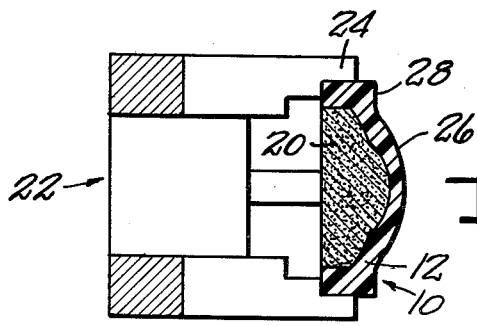
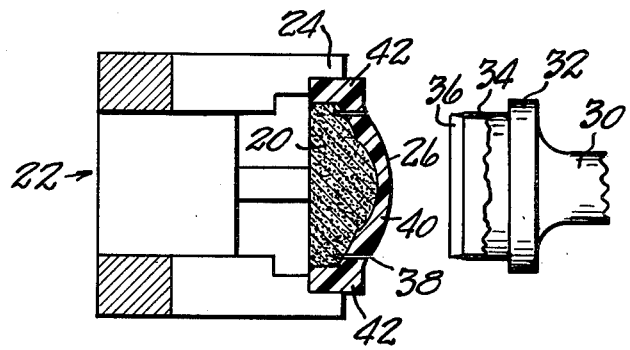
INVENTOR.
DANIEL O. ELLIOTT, JR.
BY
Eugene C. Knoblock
ATTORNEY April 24, 1962  D. O. ELLIOTT, JR  3,030,859
METHOD OF MAKING CONTACT LENSES
Filed May 25, 1959  2 Sheets-Sheet 2

INVENTOR.
DANIEL O. ELLIOTT, JR.
BY
Eugene C. Knoblock
ATTORNEY

United States Patent Office 3,030,859
Patented Apr. 24, 1962

3,030,859
METHOD OF MAKING CONTACT LENSES
Daniel O. Elliott, Jr., 828 E. Jefferson Blvd.,
South Bend, Ind.
Filed May 25, 1959, Ser. No. 815,452
8 Claims. (Cl. 88—54.5)

This invention relates to improvements in method of making contact lenses, and more particularly to a method of making a corneal type lens.

The principal object of this invention is to provide a method of making a corneal type contact lens which is simple and can be practiced rapidly so as to maintain manufacturing cost at a minimum while at the same time insuring the highest standards of accuracy of shape of the lens.

A further object is to provide a method of making contact lenses wherein a cup-shaped lens blank, having a concave surface thereof molded to desired shape, is filled with a solidifying material, following which the external configuration of the lens is partially formed, and the marginal portion of the lens is cut away from the remainder of the blank and from the filling material so that one or more further operations may be performed upon the lens while it is mounted in a support engaging the filling material to complete the lens to the point requiring separation of the lens from the filling material in order to complete shaping of the margin of the lens.

Other objects will be apparent from the following specification.

In the drawing:

FIG. 1 is an axial sectional view of a lens blank;

FIG. 2 is an axial sectional view of a lens blank having a filling material in its cavity;

FIG. 3 is a view illustrating the manner in which the filled lens blank is mounted in a holder, with the parts being shown in axial section;

FIG. 4 is an axial sectional view of a lens blank mounted in a work holder and having the convex surface of the lens partially formed;

FIG. 5 is an axial sectional view of a lens blank in a work holder, having been circularly cut concentric thereof to separate the lens blank into inner and outer concentric parts;

Figure 6:
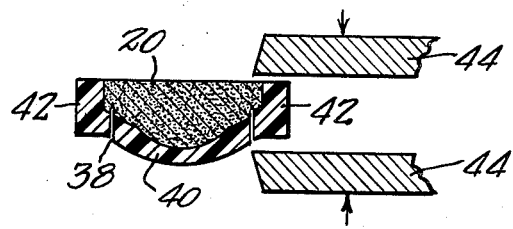
FIG. 6 is an axial sectional view illustrating the manner in which the lens blank is cut at the outer marginal portion thereof.

Referring to the drawing which illustrates the preferred embodiment of the invention, the numeral 10 designates a lens blank which is particularly suitable for use for the processing of a corneal type lens. The lens blank is preferably molded from methyl methacrylate or from any other synthetic resin having the optical properties required for use in a corneal type lens. The lens blank is preferably formed in substantially cup-shaped configuration having a circular wall or base portion 12 and a marginal tubular portion 14. The outer face of the wall 12 is preferably substantially flat or plain. The inner face of the wall 12 is molded to desired concave configuration, preferably characterized by a central portion 16 of part-spherical configuration having a radius smaller than the radius of the surrounding inner surface portion 18 which likewise is part-spherical and is axially concentric with the part 16. It will be understood that the configuration of the surfaces 16 and 18 will preferably correspond with the desired concave configuration of the finished contact lens to fit an eyeball having a selected contour or configuration and adhere thereto by reason of its fit and the natural moisture of the eyeball. The outer diameter of the surface portion 18 and the inner diameter of the tubular part 14 will be greater than the diameter of the finished contact lens.

The first step in my improved method entails the filling of the cavity of the lens blank 10 with a body 20 of material which will solidify when set. One filling material may constitute a solid non-flexing dental casting of the type commonly used for taking dental impressions. One dental wax which is particularly well suited for this purpose is produced by the Kerr Manufacturing Company and constitutes an agar base thermoplastic colloidal, known as "Hydro-Colloid," and is characterized by a melting point of approximately 200 deg. F. Any solid non-flexing filling material whose melting point is substantially below the distortion or softening point of the material of which the lens blank is made, may be employed. In the case of methyl methacrylate, the distortion point is approximately 250 deg. F. Examples of other materials useful as a filler for the lens blank are paraffin, children's molding clay with flour added to stiffen it, optical pitch of the type ordinarily used to adhere a lens to a tool or support, or a rigid backing adhered to a lens blank by means of a wax or similar adhesive. In the last named example, the interior of a lens blank may be sprayed or otherwise coated with a wax, such as a dental impression wax, and then filled with a solidifying material, such as plaster of Paris. The filler, if thermoplastic, is poured into the lens blank while at a temperature below the distortion temperature of the plastic, that is below 250 degrees, and preferably fills the cavity of the lens blank, as illustrated in FIG. 2.

After the filler has solidified and set in the lens blank, the lens blank is mounted in a collet or holder of any suitable character which is adapted to be mounted upon a lathe arbor. In the instance shown, the lathe collet is provided with a plurality of jaws 24 which frictionally engage or lightly grip the lens blank at the outer surface of the tubular portion 14 thereof to support the lens for rotation and leave exposed the entire outer surface of the transverse wall 12 of the blank and a substantial portion of the adjacent cylindrical surface of the blank, as illustrated in FIG. 3. The exposed portion of the lens blank is then shaped or machined to the approximate desired contour, providing a convex surface 26 thereon axially concentric with the concave surfaces 16 and 18 of the blank and of a diameter greater than the diameter of the desired finished contact lens, and preferably outlined or surrounded by an annular shoulder portion 28 aligned with the tubular portion 14 of the lens blank and of a diameter greater than the desired diameter of the finished lens.

After the outer surface of the lens blank has been machined to approximately the desired external convex configuration, the lens blank is preferably subjected to the action of a cutting tool, to form an annular groove 38 concentric with the lens and extending therethrough, as illustrated in FIG. 5. This cutting tool may have a shank 30 concentric with the axes of the lens blank and the collet 22, and a head 32 may be formed on and concentric with the shank 30. A tubular blade 34 is preferably carried by the head 32 in coaxial relation to the shank 30 and has a sharp leading or cutting edge 36. The tubular blade 34 is pressed against the lens blank in coaxial relation thereto and in the direction of the axis of the lens so as to produce an annular cut 38 in the lens blank extending completely therethrough and preferably partially or slightly into the filler 20, as illustrated in FIG. 5. This results in the formation of a central lens blank portion 40 and an annular or outer marginal lens blank portion 42 which are completely separated from each other but both are adhered to the wax body 20. It will be understood that groove 38 may be cut by any suitable cutter, so that the use of a tubular cutter is not required.

Figure 7:
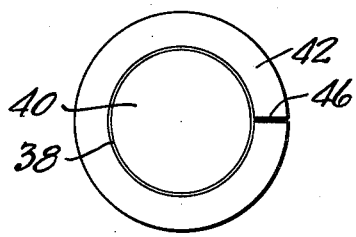
FIG. 7 is a face view of the lens blank after being cut by the operation illustrated in FIG. 6 and before removal of the marginal portion of the lens blank.
Figure 8:
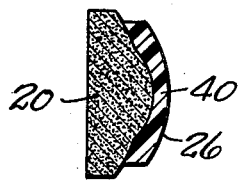
FIG. 8 is an axial sectional view of the lens blank and the carrier of filling material after removal of the outer marginal portion of the lens blank from the central part and said carrier.

In the next operation or step in the method of producing the lens, the lens blank and its contained adhered solid filler body are removed from the collet 22 and exposed to the action of a pair of cutting blades 44 at the annular portion 42 thereof, as illustrated in FIG. 6. One blade bears against the free end of the tubular portion 14 of the lens blank and the other bears against the shoulder portion 28, and the two blades are then moved toward each other in directions preferably substantially parallel to the axis of the lens blank and substantially radially positioned relative to the lens blank. The blades 44 cut through the marginal lens portion 42 at 46, as illustrated in FIG. 7. The blades are preferably of tapered or wedge-shaped cross-section, and as the blades form the cut 46 they art to spread the ends of the marginal portion 42 of the lens blank circumferentially and expand the marginal portion 42 so as to break its adhesion with the filler body 20 without distorting the filler body and without destroying the adhesion of the central portion 40 of the lens blank with the filler body. The product of this step of the process is illustrated in FIG. 8 and consists of the filler body 20 and the central portion 40 of the lens blank which is preferably of smaller diameter than the filler body.

Figure 9:
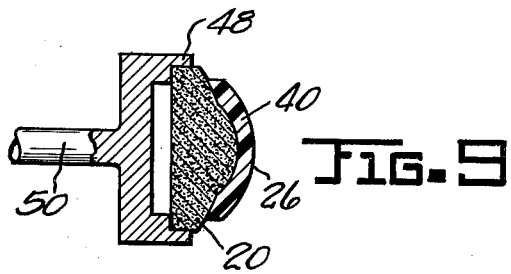
FIG. 9 is an axial sectional view illustrating a work holder mounting the filling material for the purpose of rotating the central lens segment for final convex shaping and polishing thereof.
Figure 10:
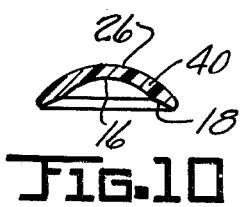
FIG. 10 is an axial sectional view of a finished contact lens.

In the next step of the process, the filler body 20 is mounted in a suitable holder, such as a cup-shaped holder as illustrated in FIG. 9, having a marginal filler gripping portion 48 whose axial dimension is preferably slightly less than the axial dimension of the margin of the filler body 20. The holder 48 is mounted upon an arbor 50 axially concentric with the holder so as to position the wax body and the lens body 40 in axial concentricity with the shaft 50. The final polishing operations upon the convex surface 26 of the lens part 40 can then be performed until they are completed. Thereupon, the assembly of the filler 20 and the lens body 40 can be separated, as by inserting a prying tool between them or by subjecting a thermoplastic filler to a heat sufficient to melt the filler but lower than the distortion or softening temperature of the plastic lens body 40. When the filler has been removed from the lens 40, the lens is in a condition in which both its concave and its convex surfaces are completely finished and only the edges thereof need be finished to complete the lens. The edge forming or contouring of the lens may be performed in any conventional manner and does not form a part of this invention, although it is necessary to complete the lens to condition it to be worn without danger of irritation or abrasion of the eye as worn.

While the method described above is preferred, it will be understood that the sequence of the steps may be varied. One possible variation is to completely shape and polish to finished form the convex surface of the lens before the cutting operation. In such case, the central lens-forming part 40 may be separated from the filler 20 and the marginal lens blank part 42 in any manner suitable, as by melting thermoplastic filler without the operation of forming cut 40 in the marginal part 42.

While the preferred embodiment of the invention has been illustrated and described, it will be understood that variations may be made in the method within the scope of the appended claims without departing from the spirit of the invention.

I claim:

1. The method of making contact lenses consisting of the steps of molding a lens blank with a selected concave lens surface and a surrounding flange, filling the concavity of said blank defined by said flange with a filling material which sets in solid rigid form, shaping to desired convexity the surface of said lens blank opposite said concave lens surface, cutting said lens blank circularly to form a central lens-forming part and a marginal part, cutting said marginal portion substantially radially by the use of blade means of wedge shape in cross-section to separate the adjacent cut ends of said marginal portion and expand said marginal portion to break its adhesion with said filling material.

2. The method of making contact lenses consisting of the steps of molding a lens blank with a selected concave lens surface and a surrounding flange, filling the concavity of said blank defined by said flange with a filling material which sets in solid rigid form, shaping to desired convexity the surface of said lens blank opposite said concave lens surface, cutting said lens blank circularly to form a central lens-forming part and a marginal part, and separating said central lens-forming part from said marginal part and said filling material.

3. The method of making contact lenses consisting of the steps of molding a lens blank with a selected concave lens surface and a surrounding flange, filling the concavity of said blank defined by said flange with a filling material which sets in solid rigid form, shaping to desired convexity the surface of said lens blank opposite said concave lens surface, cutting said lens blank circularly to form a central lens-forming part and a marginal part, cutting said marginal portion substantially radially by the use of blade means of wedge shape in cross-section to separate the adjacent cut ends of said marginal portion and expand said marginal portion to break its adhesion with said filling material, and holding said filling material and simultaneously finishing the convex surface of said lens-forming part.

4. The method of making contact lenses consisting of the steps of molding a lens blank with a selected concave lens surface and a surrounding flange, filling the concavity of said blank defined by said flange with a solid rigid dental impression wax having a melting point below the temperature required to soften said blanks, shaping to desired convexity the surface of said lens blank opposite said concave surface, cutting said lens blank circularly to form a central lens-forming part and a marginal part and separating said central lens-forming part from said marginal part and said filling material.

5. The method of making contact lens consisting of the steps of molding a lens blank with a selected concave lens surface and a surrounding flange, filling the concavity of said blank defined by said flange with a solid rigid dental impression wax having a melting point below the temperature required to soften said blank, shaping to desired convexity the surface of said lens blank opposite said concave surface, cutting said lens blank circularly to form a central lens-forming part and a marginal part and separating said marginal part from said central lens-forming part and said filling material, holding said wax and simultaneously finishing the convex surface of said lens-forming part.

6. The method of making contact lenses consisting of the steps of molding a lens blank with a selected concave lens surface and a surrounding flange, filling the concavity of said blank defined by said flange with a filling material which sets in solid rigid form, shaping to desired convexity the surface of said lens blank opposite said concave lens surface, cutting said lens blank circularly to form a central lens-forming part and a marginal part, splitting said marginal portion substantially radially and expanding said split marginal portion circumferentially to break its adhesion with said filling material.

7. The method of making contact lenses from a cup-shaped blank having a base with a selected inner concave lens surface and a marginal flange whose inner diameter is greater than the desired lens diameter, consisting of the steps of filling said blank to selected level with a thermoplastic material having a melting point below the softening point of the lens blank, said material having a solid rigid character when set and adhering to said blank, shaping to desired convexity the outer surface of the base of said blank, cutting a circular groove concentrically through said base to separate a central portion of said blank from its marginal portion, and splitting said marginal portion and circumferentially expanding the same to separate it from said rigid filling material.

8. The method of making contact lenses from a cup-shaped blank having a base with a selected inner concave lens surface and a marginal flange whose inner diameter is greater than the desired lens diameter, consisting of the steps of filling said blank to selected level with a thermoplastic material having a melting point below the softening point of the lens blank, said material having a solid rigid character when set and adhering to said blank, shaping to desired convexity the outer surface of the base of said blank, cutting a circular groove concentrically through said base to separate a central portion of said blank from its marginal portion, splitting said marginal portion and circumferentially expanding the same to separate it from said rigid material, and supporting said filling material and rotating said filling material and the attached lens blank and simultaneously finishing the outer surface of the central portion of said blank.

References Cited in the file of this patent

UNITED STATES PATENTS

| | | |
|---|---|---|
| 2,224,168 | Tillyer et al. | Dec. 10, 1940 |
| 2,225,040 | Dittmer | Dec. 17, 1940 |
| 2,330,837 | Mullen | Oct. 5, 1943 |
| 2,369,758 | Sheldon | Feb. 20, 1945 |

FOREIGN PATENTS

| | | |
|---|---|---|
| 830,699 | Germany | Feb. 7, 1952 |